Figure 1:
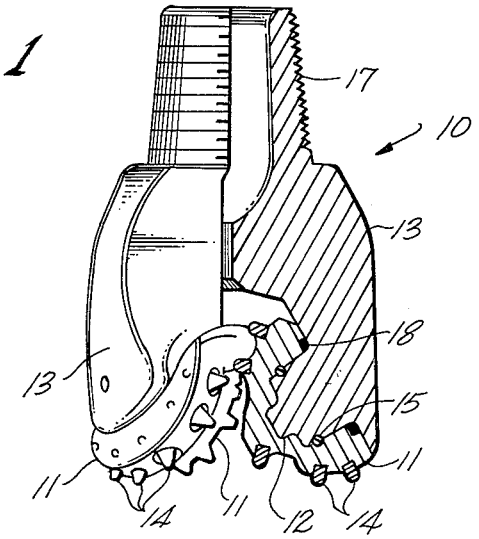
Figure 5:
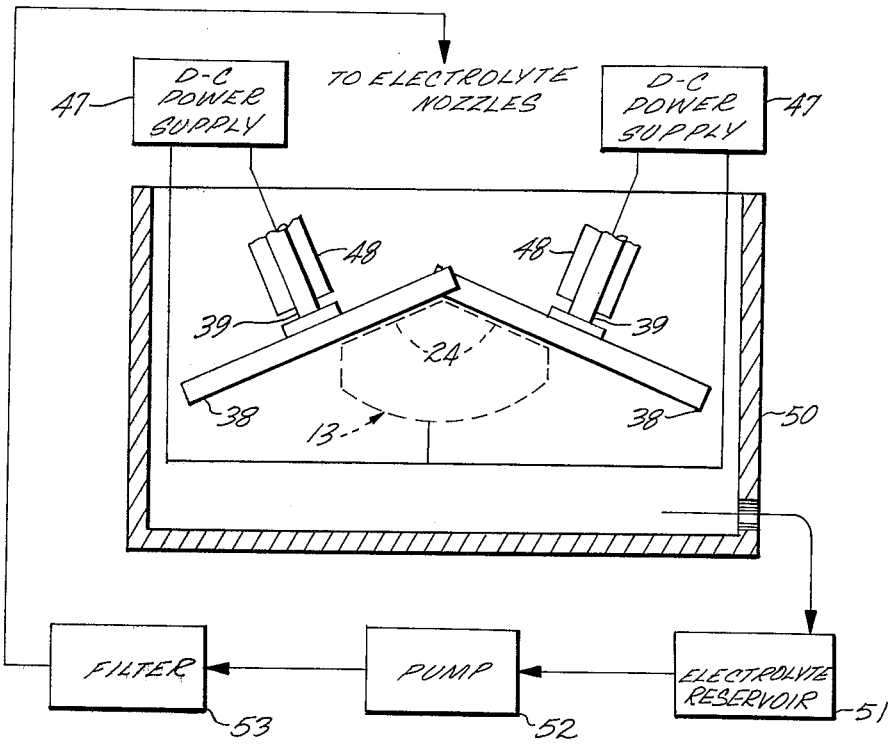
Figure 2:
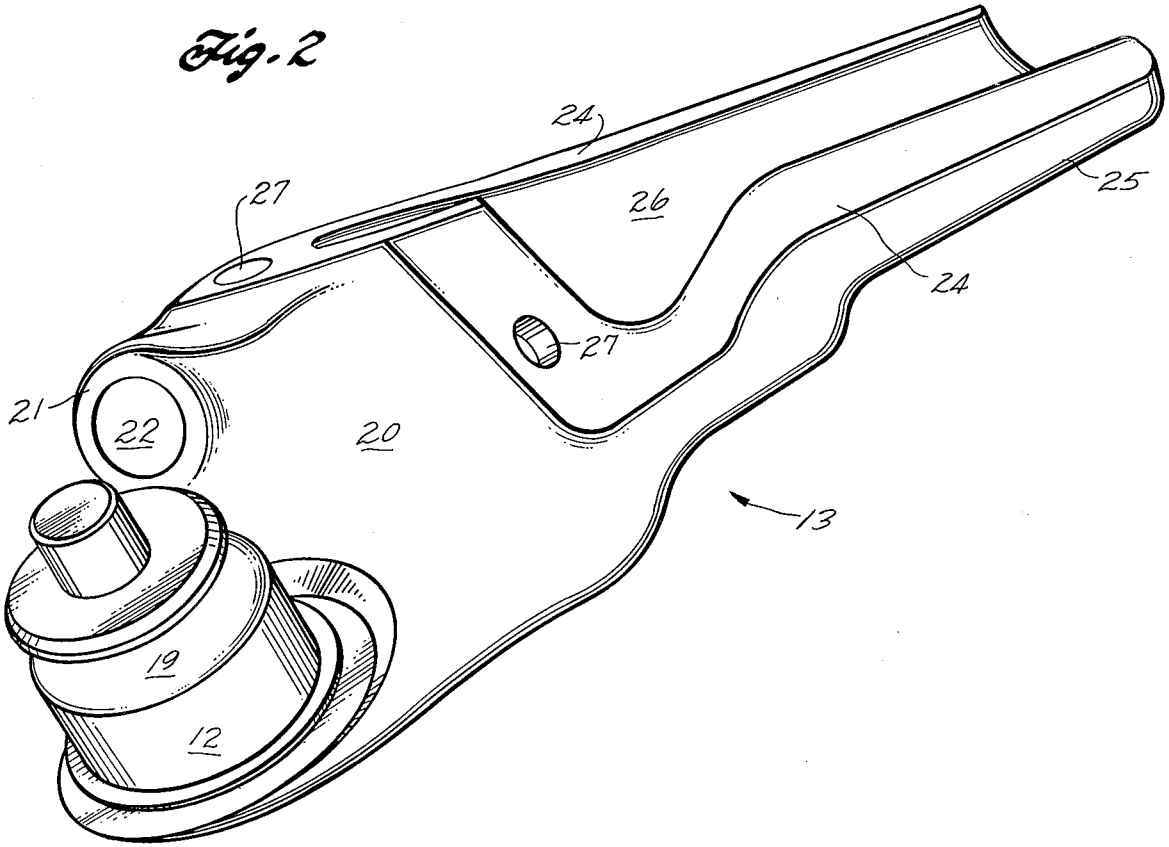
Figure 3:
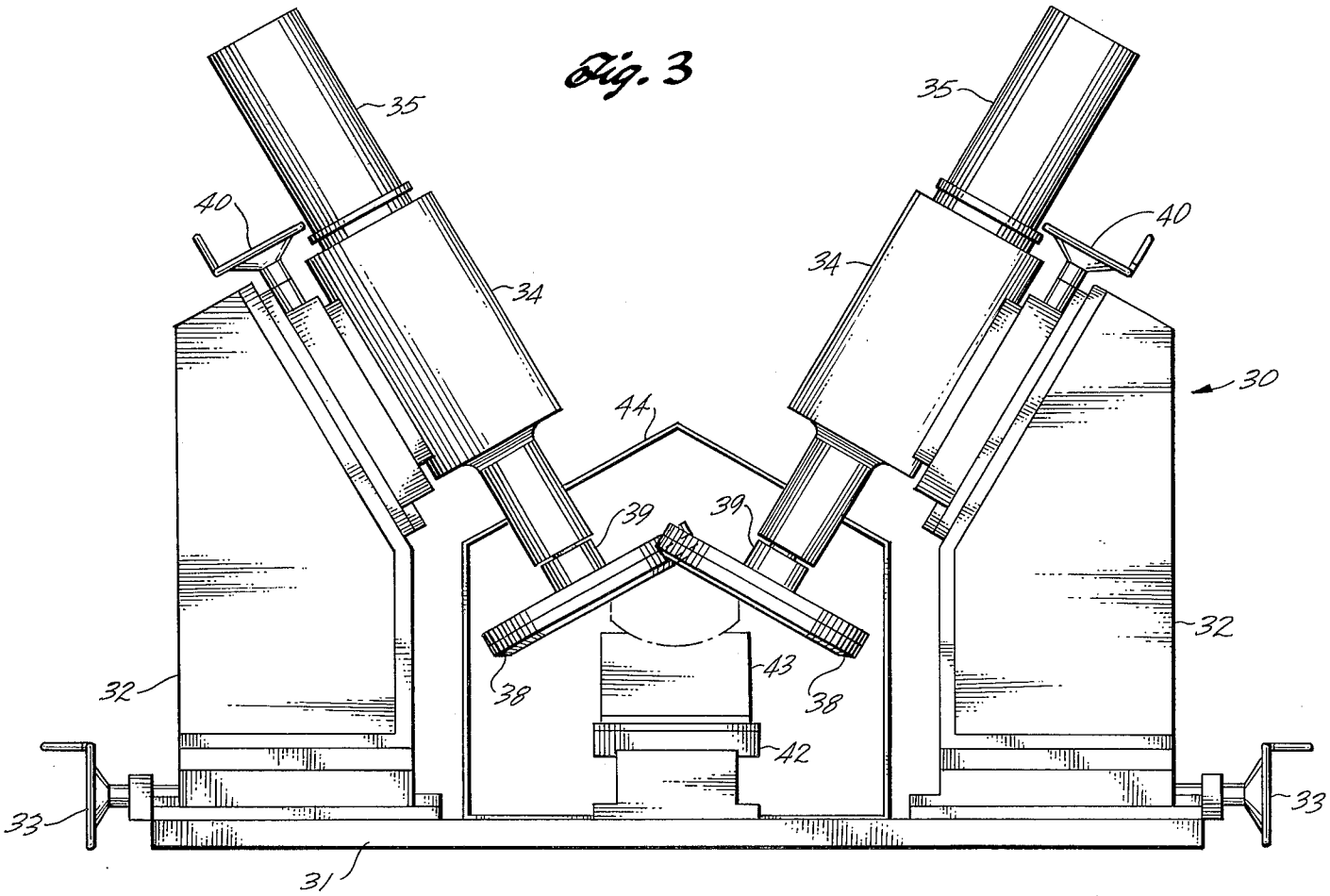
Figure 4:
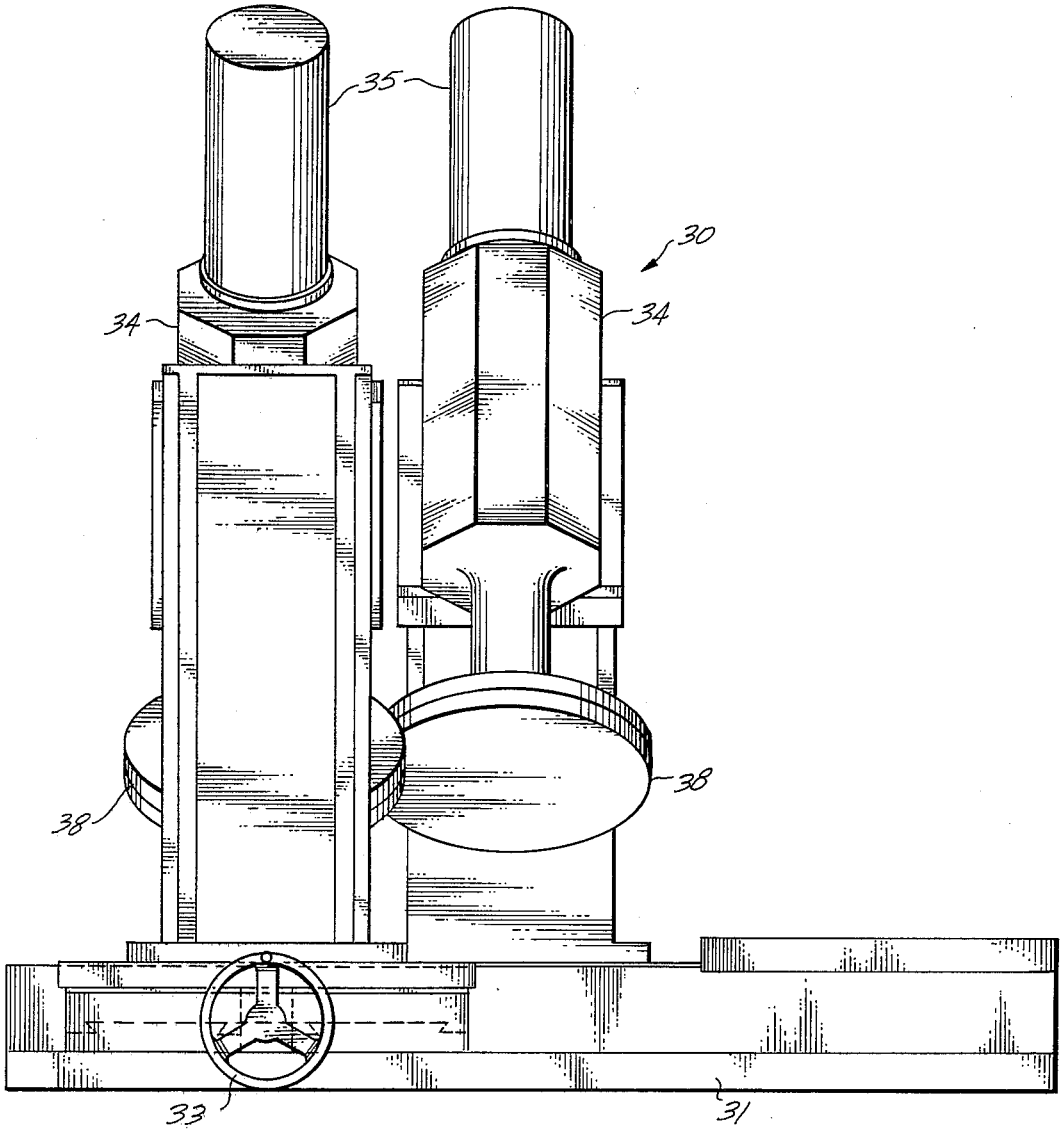

United States Defensive Publication [19] (H) [11] T969,007

Goetz [43] Apr. 4, 1978

[54] METHOD FOR MAKING ROCK BITS

[75] Inventor: Richard E. Goetz, Huntington Beach, Calif.

[73] Assignee: Smith International, Inc., Irvine, Calif.

[21] Appl. No.: 822,009

[22] Filed: Aug. 5, 1977

Related U.S. Application Data

[63] Continuation of Ser. No. 706,632, Jul. 19, 1976, abandoned.

[51] Int. Cl.[2] ..... B23K 15/00

[52] U.S. Cl. ..... 219/121 EM; 175/375; 76/108 A

[57] ABSTRACT

A method of making a rock bit which is a welded assembly of legs each carrying a rotatable cutter. Electrochemical grinding is used for finish machining of mating surfaces of heat-treated bit legs, and the legs are secured together by electron-beam welding along the mating surfaces.

8 Claims, 4 Sheets Drawing,

15 Pages Specification

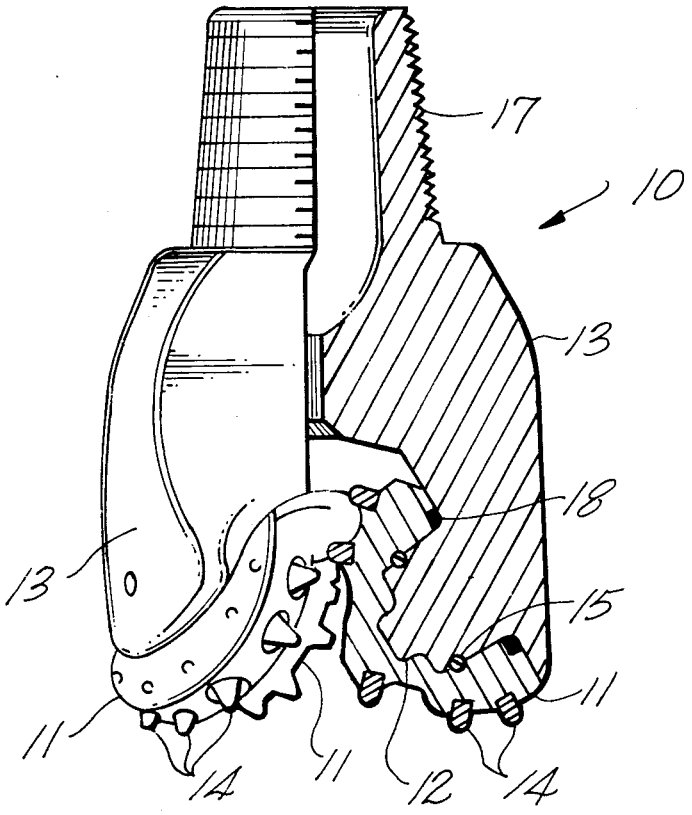

The file of this unexamined application may be inspected and copies thereof may be purchased (849 O.G. 1221, Apr. 9, 1968).